US008282761B2

(12) United States Patent
Rieger et al.

(10) Patent No.: US 8,282,761 B2

(45) Date of Patent: Oct. 9, 2012

(54) METHOD FOR SIMULTANEOUSLY CUTTING A COMPOUND ROD OF SEMICONDUCTOR MATERIAL INTO A MULTIPLICITY OF WAFERS

(75) Inventors: Alexander Rieger, Kirchdorf (DE); Hans Oelkrug, Tittmoning (DE); Josef Schuster, Ostermiething (DE)

(73) Assignee: Siltronic AG, Munich (DE)

( * ) Notice: Subject to any disclaimer, the term of this patent is extended or adjusted under 35 U.S.C. 154(b) by 279 days.

(21) Appl. No.: 12/579,127

(22) Filed: Oct. 14, 2009

(65) Prior Publication Data

US 2010/0089209 A1 Apr. 15, 2010

(30) Foreign Application Priority Data

Oct. 15, 2008 (DE) ......................... 10 2008 051 673

(51) Int. Cl.
*B28D 1/02* (2006.01)
*B32B 38/04* (2006.01)

(52) U.S. Cl. ..................... 156/250; 156/153; 156/304.1; 125/12; 125/21

(58) Field of Classification Search .................. 156/153, 156/268, 304.1, 250; 125/12, 16.02, 21, 125/35
See application file for complete search history.

(56) References Cited

U.S. PATENT DOCUMENTS 3,193,424 A * 7/1965 Scott ............................ 156/73.6
4,098,736 A * 7/1978 Li et al. ......................... 524/310
6,119,673 A 9/2000 Nakaura
6,179,909 B1 * 1/2001 Banzawa et al. ................ 117/15
6,802,928 B2 10/2004 Nakashima
2006/0032430 A1 2/2006 Bradaczek et al.
2006/0060180 A1 * 3/2006 Nakashima ..................... 125/21
2008/0099006 A1 5/2008 Huber et al.

FOREIGN PATENT DOCUMENTS

DE 102006050330 A1 5/2008
JP 7029837 A 1/1995
JP 10340869 A 12/1998

* cited by examiner

*Primary Examiner* — Katarzyna Wyrozebski Lee
*Assistant Examiner* — Scott W Dodds
(74) *Attorney, Agent, or Firm* — Leydig, Voit & Mayer, Ltd.

(57) ABSTRACT

A method for simultaneously cutting a compound rod of semiconductor material into a multiplicity of wafers. The method includes selecting a first workpiece and a second workpiece, each having two end surfaces; grinding at least one of the two end surfaces of each workpiece so as to create a ground end surface on each workpiece; cementing the ground end surface of the first workpiece to the ground end surface of second workpiece using a fastener so as to produce a compound rod piece having a longitudinal axis, wherein the fastener is disposed between the workpieces so as create a distance between the workpieces; fixing the compound rod piece in a longitudinal direction on a mounting plate; clamping the mounting plate with the compound rod piece in a wire saw; and cutting the compound rod piece perpendicularly to the longitudinal axis using the wire saw.

13 Claims, 2 Drawing Sheets

METHOD FOR SIMULTANEOUSLY CUTTING A COMPOUND ROD OF SEMICONDUCTOR MATERIAL INTO A MULTIPLICITY OF WAFERS

Priority is claimed to German Application No. DE 10 2008 051 673.2, filed on Oct. 15, 2008, the entire disclosure of which is incorporated by reference herein.

The invention relates to a method for simultaneously cutting a compound rod of semiconductor material into a multiplicity of wafers.

BACKGROUND

Workpieces of semiconductor material are conventionally cut into wafers by means of a wire saw. Wire saws are used in the prior art to cut cylindrical mono- or polycrystalline workpieces of semiconductor material, for example silicon, simultaneously into a multiplicity of wafers in one working operation. The throughput of the wire saw is in this case of great importance for the economic viability of the method.

Owing to the way in which they are produced, shorter and longer rod pieces are obtained in wafer production. It is also often necessary to cut rod portions from a single crystal, for example in order to examine the crystal properties. In order then to increase the throughput when sawing these different rod lengths, a plurality of workpieces are to be clamped simultaneously in the wire saw and cut in one working operation.

U.S. Pat. No. 6,119,673 describes the simultaneous cutting of a plurality of cylindrical workpieces, which are arranged coaxially behind one another. To this end a conventional wire saw is used, with a plurality of workpieces adhesively bonded respectively on a sawing strip being fixed with a certain spacing in a coaxial arrangement on a common mounting plate, by which they are clamped in the wire saw and cut simultaneously. This gives rise to a number of packets of wafers, corresponding to the number of workpieces, which are still fixed on the mounting plate. After the cutting, separating plates are placed loosely into the spacings between the packets of wafers in order to avoid confusion of the wafers of the various packets.

U.S. Pat. No. 6,802,928 B2 describes a method in which dummy pieces of the same cross section are adhesively bonded onto the end surfaces of the workpiece to be cut, which are cut with the workpiece and are then discarded. This is intended to prevent the wafers obtained at the two ends of the workpiece from fanning out during the end phase of the cutting, and therefore to improve the wafer geometry. This method has the crucial disadvantage that part of the gang length, which is limited by the dimensions of the wire saw, is used for cutting the "unused" dummy pieces. Furthermore the provision, handling and adhesive bonding of dummy pieces is very elaborate and difficult to manage.

In the simultaneous cutting of a plurality of workpieces in a wire saw as described in U.S. Pat. No. 6,119,673, the gang length of the wire saw also cannot be used optimally since the workpieces to be cut have very different lengths owing to the way in which they are produced. This problem arises in particular whenever the workpieces consist of monocrystalline semiconductor material, since the known crystal pulling processes only allow certain usable lengths of the crystals or, in order to monitor the crystal pulling processes—as already mentioned above—it is necessary to split the crystals and produce test samples at various positions of the crystal.

DE 102 006 050 330 discloses a method for simultaneously cutting at least two cylindrical workpieces into a multiplicity of wafers by means of a wire saw, in which 2 or more workpieces are selected from a stock of workpieces, they are fastened behind one another on a mounting plate, a certain minimum distance being maintained respectively between the workpieces, clamped in the wire saw and cut perpendicularly to their longitudinal axis (geometrical axis) by means of the wire saw. This method allows better use of the wire gang length. In order to avoid confusion, similarly as in the method described in U.S. Pat. No. 6,119,673, separating pieces are inserted laterally between the wafer packets and then fixed on the wafer carrier. The separating pieces also protect the wafer packets against tilting away laterally.

A feature common to all the known methods is that a distance between the rod pieces is to be maintained for cutting the rod pieces.

It has been found that in the methods described above, geometrical variations of the wafers sawed from a rod of particular length assembled in this way occur compared with the wafers cut from a single semiconductor rod of corresponding length. This is to be observed even when the composite rod and the single rod are equally long and the wire gang used is therefore the same.

Besides the thickness variation (TTV, GBIR), the planarity of the two surfaces of the semiconductor wafer is of great importance. After cutting a semiconductor single crystal by means of a wire saw, for example a silicon single crystal, the wafers thereby produced have an undulating surface. In the subsequent steps, for example grinding or lapping, this waviness can be removed partially or fully depending on the wavelength and amplitude of the waviness and the depth of the material removal. In the worst case, such surface irregularities ("undulations", "waviness"), which may have periodicities of from a few mm up to for example 50 mm, are still detected even after polishing on the finished semiconductor wafer where they have a negative effect on the local geometry.

The disadvantages of the methods known from the prior art are found to be particularly significant for the bow and warp parameters as a measure of the deviation of the actual wafer shape from the desired ideal wafer shape (or "sori"). This pertains in particular to the warp of the wafers. The warp is defined in SEMI Standard M1-1105, and indicates the difference of the minimum and maximum deviations of the midplane of a wafer relative to a reference plane on the backside of the wafer. Expressed simply, the warp represents a measure of the deformation of the wafer.

SUMMARY OF THE INVENTION

An aspect of the present invention is to avoid such geometrical variations and, in particular, to improve the warp of the wafers fabricated from the compound rod.

The Inventors have discovered that these geometrical variations in the prior art are attributable to technical process changes which are due to the spacing of the rod pieces.

In an embodiment, the present invention provides a method for simultaneously cutting a compound rod of semiconductor material into a multiplicity of wafers by means of a wire saw, comprising the following steps:

a) selecting at least two workpieces from a stock of workpieces, which have been cut from one or more semiconductor rods;
b) grinding at least one of the two end surfaces of each rod;
c) cementing the at least two workpieces together on their ground end surfaces by using a fastening means, to produce a compound rod piece and fixing the compound rod piece in the longitudinal direction on a mounting plate, there respectively being only a distance between the workpieces due to the fastening means located between them;

d) clamping the mounting plate with the compound rod piece fixed thereon in the wire saw; and e) cutting the compound rod perpendicularly to its longitudinal axis by means of the wire saw.

The cutting of a workpiece in step a) is preferably carried out with a wire saw. The use of an internal hole saw is likewise suitable.

The fastening means used in step c) may preferably be an adhesive.

Grinding the end surfaces so that the two end surfaces of the at least two workpieces, which adhesively bond together, are plane-parallel, allows the adhesive joint between the two rod pieces to be made as small as possible.

Preferably, only rod pieces from neighboring rod positions of the same semiconductor rod are cemented together. The two rod pieces therefore preferably have the same crystal specification (for example defect properties, doping, etc.).

Preferably, exactly two rod pieces are cemented together.

Furthermore, the rod pieces are preferably cemented together while aligning the pulling edges (making them flush) .

The rod cemented together preferably has a total length of less than or equal to 380 mm.

A two-component adhesive is preferably used as the adhesive. For example, high-performance two-component adhesives of the Araldite brand from Huntsman Advanced Materials are suitable for this.

Lastly, the compound rod is cut up into wafers by means of a wire saw. The wire sawing step itself is carried out according to the prior art.

The compound rod is preferably ground round before the wire sawing step. It is, however, likewise preferable to grind the workpieces round before they are assembled to form the compound rod.

When sawing a single crystal into individual rod pieces, it is conventionally cut to the geometrical axis. Subsequently, however, the individual rod pieces (after orientation) are conventionally ground round parallel to the crystal axis. The difference between the geometrical axis and the crystal axis results in a corresponding tilt of the end surfaces, which is corrected by corresponding right-angled grinding of the end surfaces.

The situation is different for workpieces which previously occupied neighboring positions in the single crystal. Here, it is also conceivable and preferable to obviate grinding the end surfaces and for the workpieces to be assembled into a compound rod before grinding them round, i.e. to grind the workpieces round in the composite.

Assembling rod pieces to form a compound rod without using separating pieces, and subsequent sawing, results in an even higher economic viability compared with the prior art since the use of the wire saw is further improved.

On the other hand, the compound rod according to the invention behaves similarly as a single rod in the sawing process. The geometrical variations observed in the prior art can be avoided.

Preferably, the following procedure is adopted in detail:

a) First the workpieces, possibly of different lengths, cut from a crystal by means of a bandsaw are ground round.

After grinding round, the rod piece end surfaces are ground at a defined angle setting with respect to the crystal axis and orientation setting. The two end sides of the rod piece are then exactly parallel to one another;

b) The rod pieces prepared in this way are stored and made available to a planning system for assembly. The planning system determines the optimal configuration for maximal use of the gang length and suggests this for the preparation of a compound rod;

c) The selected rod pieces are prepared for the cementing: i.e. cleaning the positions to be cemented, applying the cement in a defined layer thickness (for example by means of a serrated spatula), alignment by means of a cementing device, assembly and fixing the packet flush, cementing and fixing the sawing strip and finally curing the adhesive;

d) Sawing the compound rod by means of the wire saw;

e) Detecting the cementing position, removing cement and separating the rods. The rod pieces are preferably provided beforehand with a corresponding marking on the lateral surface for the purpose of material identification.

EXAMPLE

In order to use the wire gang length in wire saws as efficiently as possible, two rod pieces (from the same original semiconductor rod) were cemented together and "wafered", i.e. cut into wafers, by wire sawing.

To this end a rod piece of silicon, in the state not ground round, was sawed into 2 rod pieces with lengths of 97 mm and 91 mm respectively. The two rod pieces were cemented together with a two-component adhesive of the Araldite brand on the end faces and in alignment with the correct pulling edges.

This "compound rod" was subsequently ground round and sawed by means of a wire saw using zinc wire into wafers, and fully analyzed.

An advantage in this case is that the Araldite brand two-component adhesive used can be sawn through. In the example, the rod orientations for the two rod pieces were the same.

Essentially the workpieces are selected from a stock of workpieces, possibly of different lengths, so that the gang length of the wire saw is used optimally. Since no separating pieces are used, the adhesive joint between the assembled workpieces is minimal and the capacity of the wire saw is therefore utilized better, which further increases the productivity of the process compared with the prior art.

A conventional wire saw may be used in the method according to the invention. The essential components of these wire saws include a machine frame, a forward feed device and a sawing tool, which consists of a gang of parallel wire sections. The workpiece is generally fixed on a mounting plate and clamped with it in the wire saw.

In general, the wire gang of the wire saw is formed by a multiplicity of parallel wire sections, which are tensioned between at least two (optionally even 3, 4 or more) wire guide rolls, the wire guide rolls being rotatably mounted and at least one of the wire guide rolls being driven. The wire sections generally belong to a single finite wire, which is guided spirally around the roll system and is unwound from a stock roll onto a receiver roll. The gang length refers to the length of the wire gang, measured in the direction parallel to the axes of the wire guide rolls and perpendicularly to the wire sections, from the first to last wire section.

During the sawing process, the forward feed device induces a mutually opposite relative movement of the wire sections and the workpiece. As a consequence of this forward feed movement, the wire, on which a sawing suspension is applied, works through the workpiece to form parallel sawing kerfs. The sawing suspension, which is also referred to as slurry, contains hard material particles for example of silicon carbide, which are suspended in a liquid. A sawing wire with firmly bound hard material particles may also be used. In this case, it is not necessary to apply a sawing suspension. It is merely necessary to supply a liquid cooling lubricant, which protects the wire and the workpiece against overheating and at the same time transports workpiece swarf away from the cutting grooves.

The cylindrical workpieces, which are assembled to form a compound rod, may consist of a material that can be processed by means of a wire saw, for example poly- or monocrystalline semiconductor material such as silicon. In the case of monocrystalline silicon, the workpieces are generally produced by sawing an essentially cylindrical silicon single crystal into crystal pieces with a length of from several centimeters to several tens of centimeters. The minimum length of a crystal piece is generally 5 cm. The workpieces, for example the crystal pieces consisting of silicon, generally have very different lengths but always the same cross section. The term "cylindrical" is not to be interpreted as meaning that the workpieces must have a circular cross section. Rather the workpieces may have the shape of any generalized cylinder, although the application of the invention to workpieces with a cylindrical cross section is preferred. A generalized cylinder is a body which is bounded by a cylinder surface with a closed directrix curve and two parallel planes, i.e. the base surfaces of the cylinder.

The compound rod is preferably fastened not directly on the mounting plate, but first on a so-called sawing strip or sawing support. The workpiece is generally fastened on the sawing strip by adhesive bonding.

The mounting plate is clamped with the compound rod fixed thereon in a wire saw, and cut into wafers simultaneously and essentially perpendicularly to its longitudinal axis.

BRIEF DESCRIPTION OF THE DRAWINGS

The invention will be explained below with the aid of figures.

DETAILED DESCRIPTION

Figure 1:
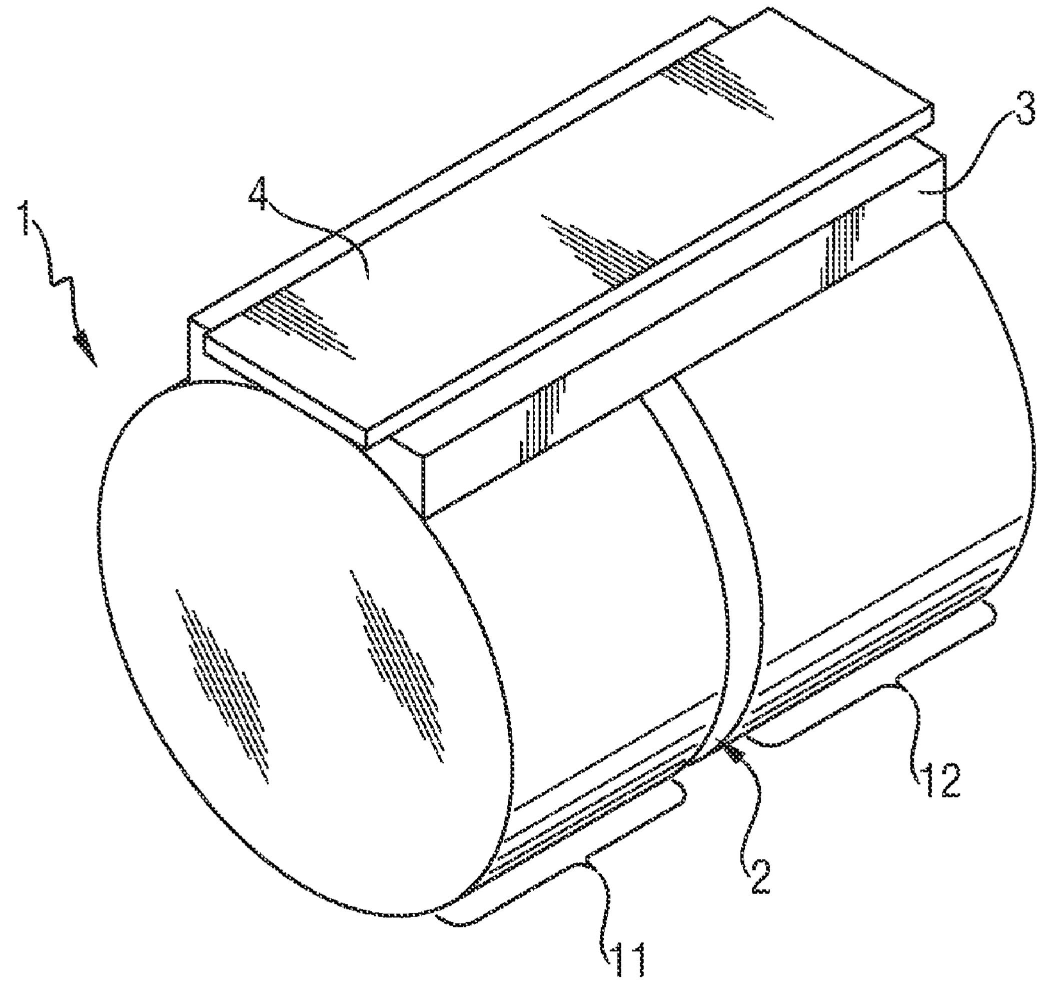
FIG. 1 schematically shows two workpieces 11 and 12 assembled to form a compound rod 1, an adhesive joint 2, a sawing strip 3 and a mounting plate 4.

The workpieces 11 and 12 are assembled with a two-component adhesive to form a compound rod 1. The fabrication accuracy of the end surfaces, on which the two workpieces are adhesively bonded together, allows the adhesive joint 2 to be selected as small as possible. The workpieces 11 and 12 assembled to form a compound rod 1 are cemented onto a sawing strip 3. The compound rod 1 comprising the two workpieces 11 and 12 and with the sawing strip 3 is fixed on a mounting plate 4 and clamped in a wire saw.

Table 1 shows various comparative values of geometrical parameters for assembled rod pieces according to the prior art (column 2) and for compound rods according to the invention (column 3).

Three values of three different quantile values are given for each parameter: thus, Wav_max 97.7%=6.29 μm/mm means that 97.7% of the wafers have a Wav_max of 56.29 μm/mm or less, etc.

A significant improvement over the prior art is found for virtually all studied parameters and quantile values.

The geometry of the wafer in the saw's forward feed direction is determined, for example, by a scanning capacitive sensor pair. First, the difference of the front- and backside signals is taken. In order to determine the waviness, a window with a length of 10 mm is passed over the evaluation curve thus obtained. The maximum deviation within the window generates a new value for the window center (rolling boxcar filtering). The greatest deviation (peak-to-valley (PV)) within the entire scan over the wafer is the Waviness_max (Wav_max). The Waviness_in is determined in the same fashion, but only the first 50 mm of the scan (wire saw incision region) are considered (similarly to this: Wav_out).

Bow and warp represent a measure of the deformation of the wafer. Warp is the sum of the maximum deviation (upward and downward) of the neutral fiber of the entire wafer from a reference plane (three-dimensional).

TABLE 1

| Tested Parameter (Minimum avg., Sigma) | Comparative examples (Prior art) | Results Compound Rod (Invention) |
|---|---|---|
| Wav_max 2.3% | 5.13 μm/mm | 2.80 μm/mm |
| Wav_max 50.0% | 12.94 μm/mm | 7.96 μm/mm |
| Wav_max 97.7% | 56.29 μm/mm | 22.73 μm/mm |
| Wav_in 2.3% | 3.30 μm/mm | 2.52 μm/mm |
| Wav_in 50.0% | 11.72 μm/mm | 4.44 μm/mm |
| Wav_in 97.7% | 56.29 μm/mm | 11.89 μm/mm |
| Wav_out 2.3% | 2.87 μm/mm | 1.52 μm/mm |
| Wav_out 50.0% | 6.41 μm/mm | 5.37 μm/mm |
| Wav_out 97.7% | 17.23 μm/mm | 22.66 μm/mm |
| GBIR 2.3% | 13.19 μm | 11.75 μm |
| GBIR 50.0% | 16.10 μm | 15.84 μm |
| GBIR 97.7% | 45.28 μm | 25.14 μm |
| LSR 2.3% | 4.83 μm/mm | 4.78 μm/mm |
| LSR 50.0% | 13.09 μm/mm | 7.81 μm/mm |
| LSR 97.7% | 34.75 μm/mm | 18.95 μm/mm |
| Bow/Warp 2.3% | −5.59 μm | −3.80 μm |
| Bow/Warp 50.0% | −1.65 μm | −1.64 mm |
| Bow/Warp 97.7% | 1.96 μm | 0.40 μm |

Linear Shape Range (LSR) corresponds to the sum of the maximum deviations of the neutral fiber of a scan in the saw's forward feed direction from a straight reference line (two-dimensional).

GBIR, formerly also referred to as TTV, corresponds to the total thickness variance (difference between thickness maximum and minimum).

For example, the measuring instrument MX 7012 (High Resolution Thickness and Surface Profiler for as-sawn Wafer) from E+H Eichhorn+Hausmann is suitable for determining said geometrical parameters.

Also, the warp distribution (quantile values in % against warp number in μm) of the cut wafers was determined once for a single rod (not assembled from individual workpieces), a compound rod according to the invention and a rod assembled from workpieces according to the prior art (separated from one another, with separating pieces). All the rods had the same length of 380 mm, the same crystal specification and the same orientation.

A significant improvement in the warp distribution is found compared with the assembled workpieces in the prior art. This confirms that, during wire sawing, compound rods according to the invention do not behave like single rods assembled from workpieces.

For orders with a demanding warp specification, the invention therefore makes it possible to produce a multiplicity of wafers from compound rods, which have a relatively narrow distribution of the "warp" geometrical parameter at a comparatively low level.

Figure 2:
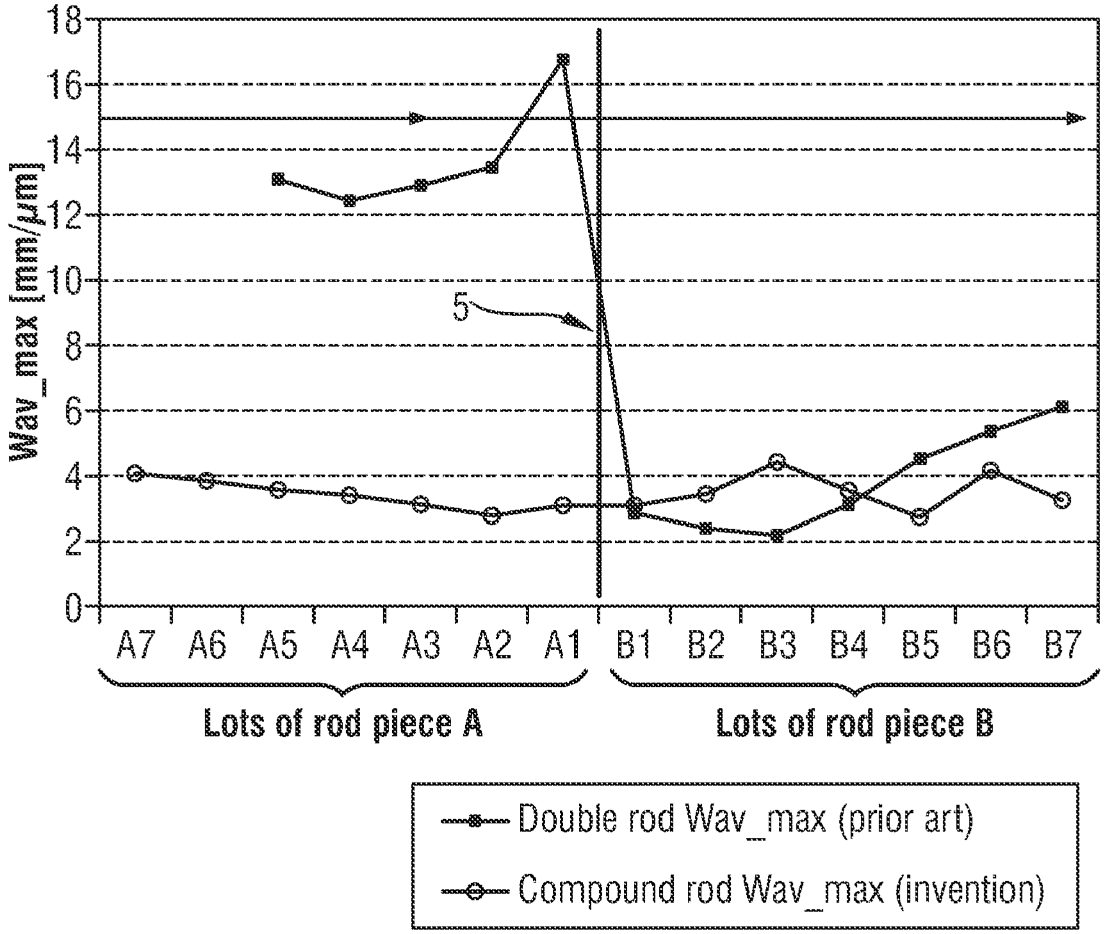
FIG. 2 shows the distribution of the Wav_max parameter likewise for a rod assembled from two workpieces according to the prior art and a compound rod according to the invention.

FIG. 2 shows the distribution of the Wav_max parameter likewise for a rod assembled from two workpieces according to the prior art and a compound rod according to the invention, which is also assembled from two workpieces but according to the invention these are separated from one another only by a fastening means (two-component adhesive). The Wav_max values are respectively represented for seven lots of workpiece A and workpiece B in the vicinity of the cementing position of workpieces A and B. After the cutting, a lot comprises a plurality of wafers which are subsequently received in cassettes (wafer boxes) ("split lots"). The Wav_max value per wafer was determined for each lot. 5 shows the bonding position or cementing position between the workpieces A and B for the compound rod.

In the double rod according to the prior art, there is a distance between the lots A1 and B1. The workpieces are not cemented together, rather they are cemented at a certain distance from one another on a sawing strip.

A significant jump in the Wav_max value is found between lots A1 and B1 for the double rod according to the prior art. Such a jump in the waviness does not occur in the compound rod according to the invention after the sawing: the waviness values of lots A1 and B1 are virtually identical, which illustrates the advantage of the method according to the invention.

Lots (not represented in the figure) following lot B7 show higher Wav_max values. The higher quantile values indicated in Table 1 are thereby also explained. Such a rise in the waviness, however, also occurs in single rods and is not a focus of attention in the scope of this invention. FIG. 2 relates only to the profile of the waviness in the region of the transition of workpiece A and workpiece B.

For orders with a demanding waviness specification, the invention therefore makes it possible to produce a multiplicity of wafers from compound rods, which have a relatively narrow distribution of the "waviness" parameter (cf. Table 1), in particular while avoiding the jump observed in the prior art in the region of the bonding position of the assembled workpieces, as shown in FIG. 2.

What is claimed is:

1. A method for simultaneously cutting a compound rod of semiconductor material into a multiplicity of wafers, the method comprising:

- selecting a first workpiece and a second workpiece from a set of workpieces cut from at least one semiconductor rod, wherein the first and the second workpieces each include two end surfaces;
- grinding at least one of the two end surfaces of each workpiece so as to create a ground end surface on each workpiece;
- cementing the ground end surface of the first workpiece to the ground end surface of the second workpiece using a fastener so as to produce a compound rod piece having a longitudinal axis, wherein the fastener is disposed between the workpieces so as create a distance between the workpieces;
- fixing the compound rod piece in a longitudinal direction on a mounting plate;
- clamping the plate with the compound rod piece in a wire saw; and
- cutting the compound rod piece perpendicularly to the longitudinal axis using the wire saw so as to form wafers from each of the first and second workpieces.

2. The method as recited in claim 1, further comprising cutting the set of workpieces using one of the wire saw and an internal hole saw before the selecting.

3. The method as recited in claim 1, wherein the compound rod piece includes two workpieces from neighboring rod positions of the same semiconductor rod.

4. The method as recited in claim 1, wherein the cementing includes cementing no more than two workpieces together.

5. The method as recited in claim 1, wherein the cementing includes aligning a pulling edge of each of the first and second workpieces so as to make them flush with one another.

6. The method as recited in claim 1, wherein the compound rod piece has a total length of less than or equal to 380 mm.

7. The method as recited in claim 1, wherein the fastener includes an adhesive.

8. The method as recited in claim 7, wherein the adhesive includes a two-component adhesive.

9. The method as recited in claim 1, further comprising grinding the compound rod round before the cutting of the compound rod piece.

10. The method as recited in claim 1, wherein each workpiece in the set of workpieces is ground round before the cementing step.

11. A method for simultaneously cutting a compound rod of semiconductor material into a multiplicity of wafers, the method comprising:

- selecting a first workpiece and a second workpiece from a set of workpieces cut from at least one semiconductor rod, wherein the first and the second workpieces each include two end surfaces;
- grinding at least one of the two end surfaces of each workpiece so as to create a ground end surface on each workpiece;
- cementing the ground end surface of the first workpiece to the ground end surface of the second workpiece using a fastener so as to produce a compound rod piece having a longitudinal axis, wherein the fastener is disposed between the workpieces so as create a distance between the workpieces;
- fixing the compound rod piece in a longitudinal direction on a mounting plate;
- clamping the mounting plate with the compound rod piece in a wire saw; and
- cutting the compound rod piece perpendicularly to the longitudinal axis using the wire saw,
- wherein the grinding step includes grinding at a defined angle with respect to a crystal lattice and orientation setting so as to cause the ground surfaces to be parallel to one another.

12. The method as recited in claim 1, further comprising providing the first and second workpieces with a corresponding marking on a lateral surface so as to identify the material.

13. A method for simultaneously cutting a compound rod of semiconductor material into a multiplicity of wafers, the method comprising:

- selecting a first workpiece and a second workpiece from a set of workpieces cut from neighboring rod positions on a semiconductor rod, wherein the first and the second workpieces each include two end surfaces;
- cementing the end surface of the first workpiece to the end surface of the second workpiece using a fastener so as to produce a compound rod piece having a longitudinal axis, wherein the fastener is disposed between the workpieces so as create a distance between the workpieces;
- fixing the compound rod piece in a longitudinal direction on a mounting plate;
- clamping the mounting plate with the compound rod piece in a wire saw; and
- cutting the compound rod piece perpendicularly to the longitudinal axis using the wiresaw so as to form wafers from each of the first and second workpieces.

* * * * *